United States Patent [19]
Alexander et al.

[11] Patent Number: 5,743,587
[45] Date of Patent: Apr. 28, 1998

[54] APPARATUS FOR USE IN AN AUTOMOTIVE VEHICLE HAVING A CONVERTIBLE ROOF SYSTEM

[75] Inventors: Michael P. Alexander, Grosse Ile, Mich.; George A. Gaffoglio, Laquna Niguel, Calif.; Christopher I. Ito, Canton, Mich.; Darin Kirschner, Stevenson Ranch, Calif.

[73] Assignee: ASC Incorporated, Southgate, Mich.

[21] Appl. No.: 820,750

[22] Filed: Mar. 19, 1997

Related U.S. Application Data

[63] Continuation of Ser. No. 175,149, Dec. 29, 1993, abandoned.

[51] Int. Cl.$^6$ ........................ B60J 7/08
[52] U.S. Cl. .................. 296/108; 296/107; 296/117; 296/136
[58] Field of Search .................. 296/107, 108, 296/117, 136

[56] References Cited

U.S. PATENT DOCUMENTS

| 404,405 | 6/1889 | Haughey . |
|---|---|---|
| 1,184,734 | 5/1916 | Freeman . |
| 1,748,736 | 2/1930 | Selje . |
| 1,784,279 | 12/1930 | Ellerbeck . |
| 1,988,346 | 1/1935 | Wagner . |

(List continued on next page.)

FOREIGN PATENT DOCUMENTS

| 0261379 A2 | 4/1987 | European Pat. Off. . |
|---|---|---|
| 0246201 | 11/1987 | European Pat. Off. . |
| 0494366 A2 | 7/1992 | European Pat. Off. . |
| 557699 | 8/1923 | France . |
| 753940 | 10/1933 | France . |
| 774595 | 12/1934 | France . |
| 1049026 | 12/1953 | France . |
| 3416286 | 10/1984 | Germany . |
| 3635373 A1 | 4/1988 | Germany . |
| 3635887 A1 | 5/1988 | Germany . |
| 3733892 A | 4/1989 | Germany . |
| 3816060 A | 11/1989 | Germany . |
| 4010276 A1 | 10/1990 | Germany . |
| 9108242 | 12/1992 | Germany . |
| 4211918 C1 | 3/1993 | Germany . |
| 4134606 A1 | 4/1993 | Germany . |
| 4218380 C1 | 5/1993 | Germany . |
| 4311240 C1 | 4/1994 | Germany . |
| 4445580 C1 | 12/1995 | Germany . |
| 4445941 C1 | 3/1996 | Germany . |
| 4445944 C1 | 4/1996 | Germany . |
| 4446483 A1 | 6/1996 | Germany . |
| 19518071 A1 | 11/1996 | Germany . |
| 19532568 C1 | 11/1996 | Germany . |
| 19532567 C1 | 12/1996 | Germany . |
| 430910 | 2/1948 | Italy . |
| 2-144226 | 4/1990 | Japan . |
| 650980 | 8/1985 | Switzerland . |
| 413467 | 7/1934 | United Kingdom . |
| 756531 | 9/1956 | United Kingdom . |
| 2257949 | 1/1993 | United Kingdom . |
| 2294432 | 5/1996 | United Kingdom . |

OTHER PUBLICATIONS

Picture of a 1957 Ford Fairlane retractable hardtop convertible, *The Detroit News*, Apr. 6, 1994.

Viper Pure Performance by Dodge/Auto Editors of Consumer Guide®, Publications International, Ltd., pp. 6 and 7, 1993.

*Primary Examiner*—Gary C. Hoge
*Attorney, Agent, or Firm*—Harness, Dickey & Pierce, P.L.C.

[57] ABSTRACT

An apparatus for use in an automotive vehicle having a convertible roof system is comprised of an escutcheon which is juxtapositioned proximate with a roof and movable between a functional position and a hidden position. In another aspect of the present invention, an interior trim panel substantially hides a portion of a balance link as viewed from inside a passenger compartment of an automotive vehicle when a roof is in a fully extended position.

62 Claims, 10 Drawing Sheets

U.S. PATENT DOCUMENTS

| | | |
|---|---|---|
| 2,007,873 | 7/1935 | Paulin . |
| 2,076,243 | 4/1937 | Marshall et al. . |
| 2,564,446 | 8/1951 | Parsons . |
| 2,580,486 | 1/1952 | Vigmostad . |
| 2,596,355 | 5/1952 | Ackermans . |
| 2,704,225 | 3/1955 | Anschuetz et al. . |
| 2,747,928 | 5/1956 | Olivier et al. . |
| 2,768,024 | 10/1956 | Spear, Jr. . |
| 2,768,025 | 10/1956 | Spear, Jr. et al. . |
| 2,770,489 | 11/1956 | Garvey et al. . |
| 2,824,751 | 2/1958 | Wilfert . |
| 2,841,441 | 7/1958 | Evans . |
| 2,856,231 | 10/1958 | Zeman . |
| 2,869,923 | 1/1959 | Mulichak . |
| 2,919,156 | 12/1959 | Dodge . |
| 2,939,742 | 6/1960 | Dardarian et al. . |
| 3,059,962 | 10/1962 | Harms et al. . |
| 3,263,984 | 8/1966 | Linn . |
| 3,338,624 | 8/1967 | Champion . |
| 3,357,738 | 12/1967 | Bourlier . |
| 3,375,037 | 3/1968 | Hunt, Jr. . |
| 3,377,099 | 4/1968 | Podolan . |
| 3,575,464 | 4/1971 | Himka et al. . |
| 3,994,524 | 11/1976 | Lehmann . |
| 4,168,859 | 9/1979 | Breitschwerdt et al. . |
| 4,634,171 | 1/1987 | McKeag . |
| 4,712,828 | 12/1987 | Albrecht . |
| 4,720,133 | 1/1988 | Alexander et al. . |
| 4,729,592 | 3/1988 | Tuchiya et al. . |
| 4,746,163 | 5/1988 | Muscat . |
| 4,784,428 | 11/1988 | Moy et al. . |
| 4,854,634 | 8/1989 | Shiraishi et al. . |
| 4,895,409 | 1/1990 | Konishi et al. . |
| 4,936,626 | 6/1990 | Gmeiner et al. . |
| 4,950,022 | 8/1990 | Pattee . |
| 4,984,841 | 1/1991 | Bauer et al. . |
| 5,004,291 | 4/1991 | Bauer et al. . |
| 5,033,789 | 7/1991 | Hayashi et al. . |
| 5,067,768 | 11/1991 | Fischbach . |
| 5,090,764 | 2/1992 | Kogawa et al. . |
| 5,118,158 | 6/1992 | Truskolaski . |
| 5,161,852 | 11/1992 | Alexander et al. . |
| 5,195,798 | 3/1993 | Klein et al. . |
| 5,207,474 | 5/1993 | Licher et al. . |
| 5,225,747 | 7/1993 | Helms et al. . |
| 5,429,409 | 7/1995 | Corder et al. . |
| 5,490,709 | 2/1996 | Rahn . |
| 5,520,432 | 5/1996 | Gmeiner et al. . |
| 5,533,777 | 7/1996 | Kleemann et al. . |
| 5,542,735 | 8/1996 | Furst et al. . |

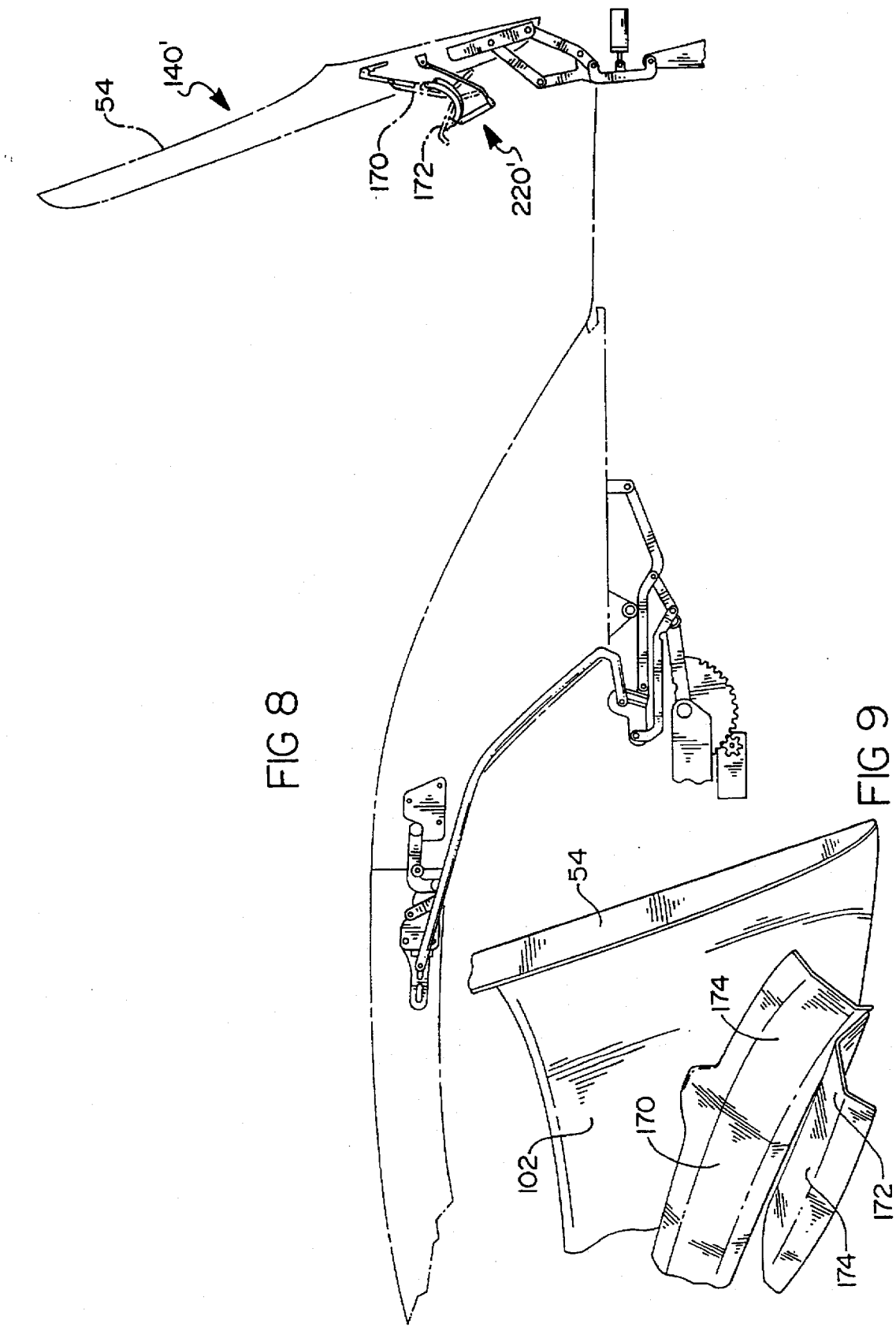

APPARATUS FOR USE IN AN AUTOMOTIVE VEHICLE HAVING A CONVERTIBLE ROOF SYSTEM

This application is a continuation of application Ser. No. 08/175,149, filed Dec. 29, 1993, now abandoned.

BACKGROUND AND SUMMARY OF THE INVENTION

This invention relates generally to roof systems and specifically to an automotive vehicle having a convertible roof system.

It is known to provide a retractable hard-top roof system for a convertible automotive vehicle. Traditionally, such a retractable hard-top roof system employs a plurality of rigid roof panels which can be retracted for stowage into the trunk of the automotive vehicle. Such a system is disclosed in U.S. Pat. 2,939,742 entitled "Foldable Vehicle Top" which issued to Dardarian et al. on Jun. 7, 1960. This system, however, pre-empts valuable storage space within the trunk.

More recently, various retractable roof systems have been developed which retract a rigid roof into a passenger compartment of an automotive vehicle. These systems stow the retracted roof in a substantially vertical orientation behind either the front or rear seats. While these conventional designs maintain some of the storage space within the trunk, the retracted roof is often stored in an unsightly manner. Examples of two such systems are disclosed in U.S. Pat. No. 5,195,798 entitled "Retractable Roof For Vehicles" which issued to Klein et al. on Mar. 23, 1993, and U.S. Pat. No. 4,854,634 entitled "Upper Body Structure For A Convertible Vehicle" which issued to Shiraishi et al. on Aug. 8, 1989.

It is also common to employ a tonneau cover in combination with a convertible soft-top roof. Examples of these tonneau covers are disclosed in the following U.S. Pat. Nos. 5,052,740 entitled "Folding Top For Vehicles" which issued to Bauer et al. on Oct. 1, 1991; 4,799,729 entitled "Tonneau Cover Mechanism For Convertible Automobiles" which issued to Muscat on Jan. 24, 1989; 4,778,215 entitled "Flexible Roof For Motor Vehicles" which issued to Ramaciotti on Oct. 18, 1988; and, 2,747,928 entitled "Folding Top Compartment Cover" which issued to Olivier et al. on May 29, 1956; all of which are incorporated by reference herewithin. These exemplary tonneau covers are often disadvantageous in that they have essentially the same front edge configuration when the roof is in an extended position and when the roof is in a retracted position. Thus, undesirable gaps are often present when either the roof is fully extended or retracted. Therefore, it would be desirable to have an escutcheon which can be extended to a functional position or retracted to a hidden position so as to aesthetically cover any gaps between a roof and an adjacent body of an automotive vehicle while avoiding the aforementioned problems.

Moreover, most conventional automotive vehicles having convertible roofs provide a balance link which is attached to a forward portion of the roof. This balance link aids in supporting and moving the roof during extension and retraction thereof. Examples of such balance links are shown in the following U.S. Pat. Nos.: 4,895,409 entitled "Convertible Vehicle Body Structure" which issued to Konishi et al. on Jan. 23, 1990; 2,768,024 entitled "Retractable Rigid Automobile Top" which issued to Spear on Oct. 23, 1956; and the aforementioned Shiraishi et al. patent. While these exemplary patents show a variety of balance link mechanisms, they all appear to be visible from within the automotive vehicle when the roof is in its extended position. Therefore, it would be desirable to provide an interior trim panel mounted upon an interior surface of a roof which substantially hides an intermediate portion of a balance link therein when the roof is in an extended position so as to avoid the aforementioned problems.

In accordance with the present invention, the preferred embodiment of a new and useful apparatus for use in an automotive vehicle having a convertible roof system is comprised of an escutcheon which is juxtapositioned proximate with a roof and movable between a functional position and a hidden position. The functional position allows the escutcheon to be substantially visible external to the automotive vehicle and the hidden position allows the escutcheon to be substantially hidden from view external to the automotive vehicle. The escutcheon is positioned in the functional position when the roof is in a retracted position. Alternately, the escutcheon is positioned in the hidden position when the roof is in an extended position. The present invention escutcheon can also be used in combination with a movable tonneau cover.

The escutcheon of the present invention is advantageous over traditional tonneau covers in that the present invention escutcheon can be moved to various positions thereby providing a close-out apparatus having varied configurations for aesthetically covering gaps against a roof when the roof is both fully extended and fully retracted. Accordingly, the present invention more effectively covers these gaps as compared to conventional designs.

In another aspect of the present invention, an interior trim panel is attached to an inside surface of a roof. The interior trim panel substantially hides an intermediate portion of a balance link therein as viewed from inside a passenger compartment of an automotive vehicle when a roof is in a fully extended position. The interior trim panel of the present invention is advantageous over conventional designs since balance links which require an extensive path of movement during retraction can still be substantially hidden from view when the roof is in an extended position.

Additional advantages and features of the present invention will become apparent from the following description and appended claims, taken in conjunction with the accompanying drawings.

BRIEF DESCRIPTION OF THE DRAWINGS

FIGS. 4, 5, 7, 8 and 10 are a series of side elevational views showing the preferred embodiment of the apparatus of the present invention of FIG. 2 in various sequential extending positions;

FIGS. 6 and 9 are enlarged perspective views showing the preferred embodiment of the apparatus of the present invention of FIG. 2 in various positions;

DETAILED DESCRIPTION OF THE PREFERRED EMBODIMENT

Figure 1:
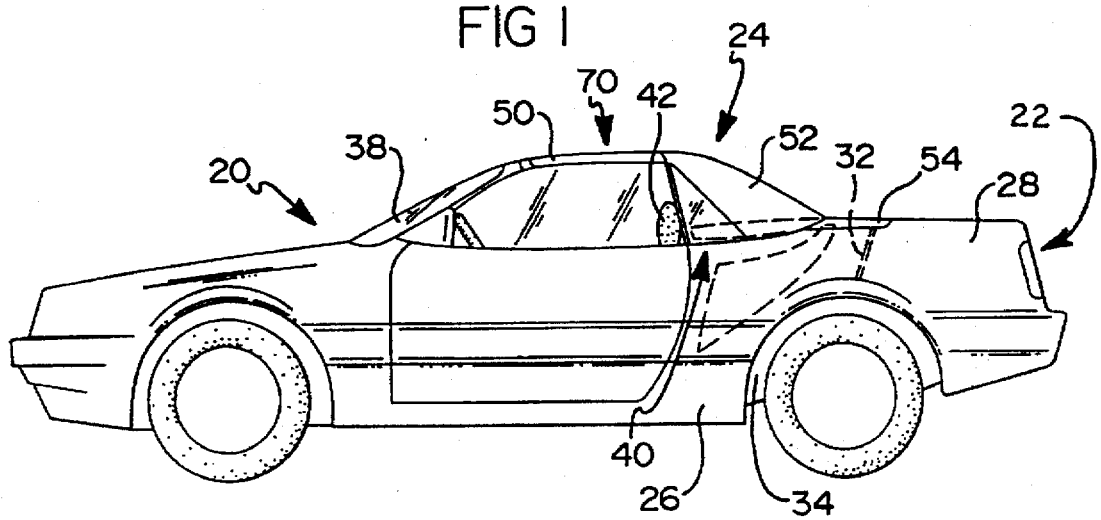
FIG. 1 is a side elevational view of a preferred embodiment of the apparatus of the present invention in relation to an automotive vehicle having a convertible roof system.
Figure 2:
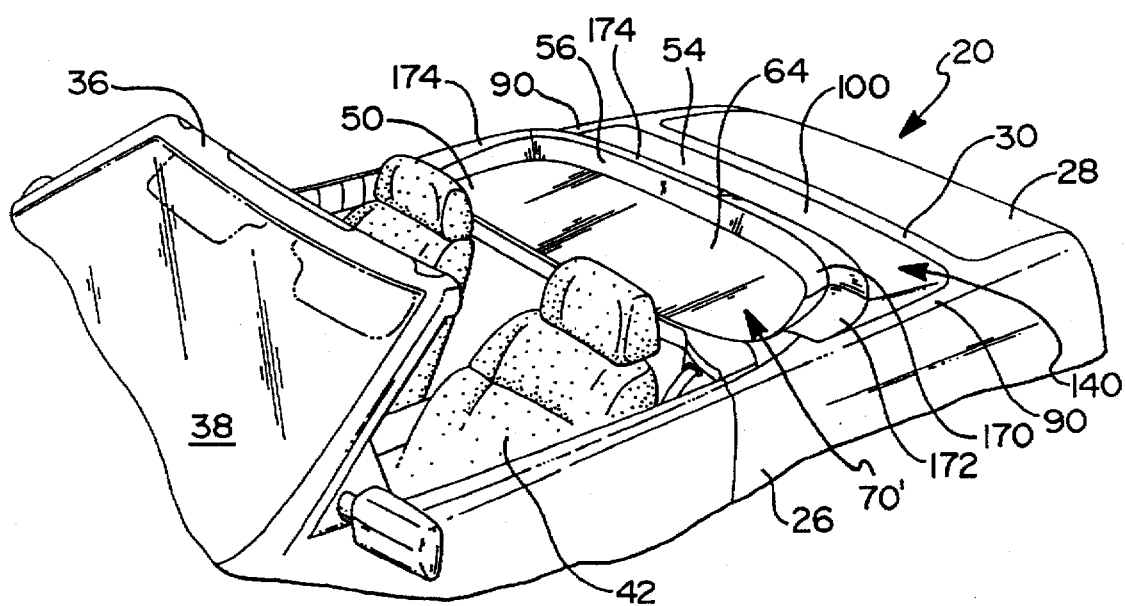
FIG. 2 is a fragmentary perspective view of the convertible roof system of the present invention of FIG. 1 shown in a fully retracted position in relation to the automotive vehicle.
Figure 3:
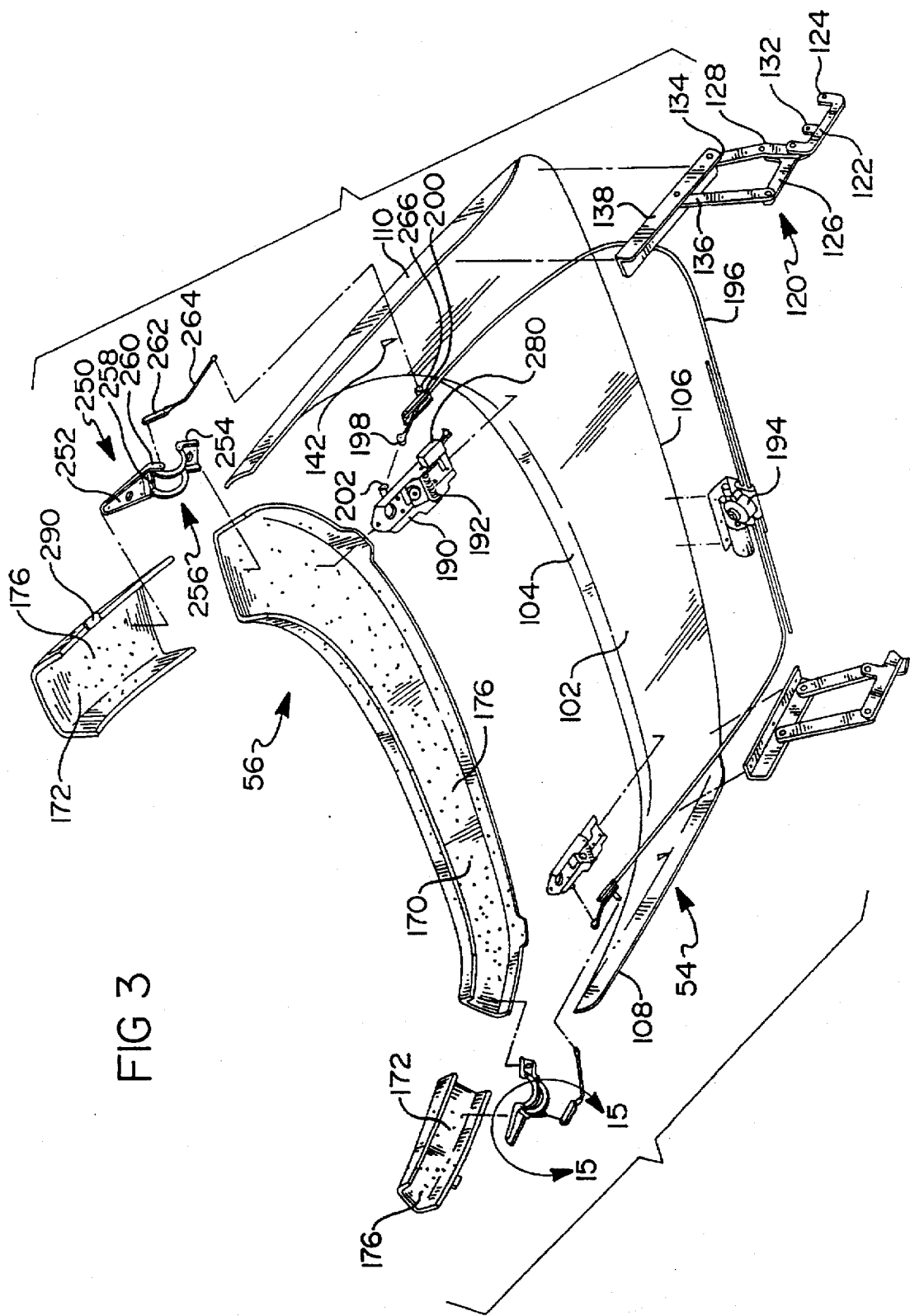
FIG. 3 is an exploded perspective view showing an escutcheon and a tonneau cover of the apparatus of the present invention of FIG. 2.
Figure 10:
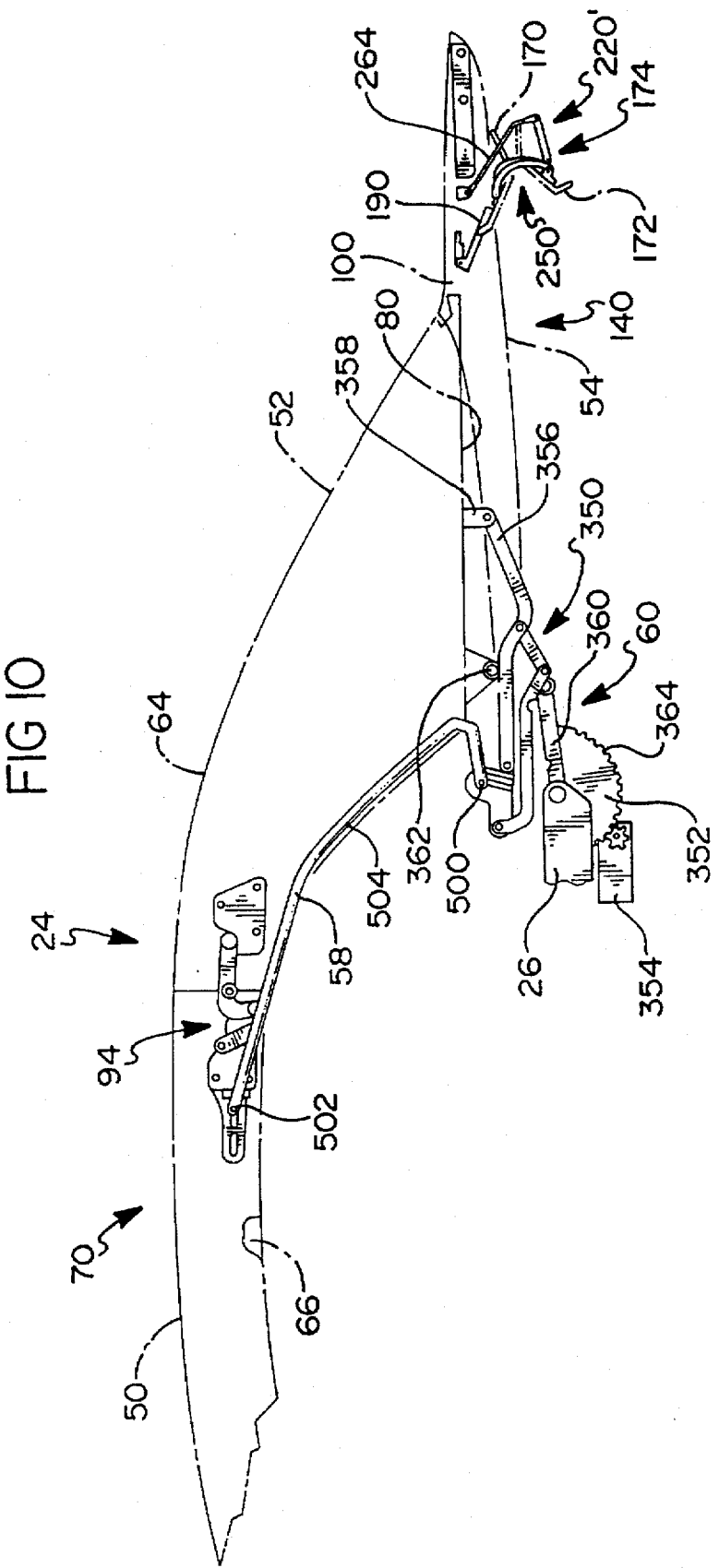

An automotive vehicle 20 is shown in FIGS. 1 and 2. Automotive vehicle 20 is constructed with a body 22 and a retractable hard-top roof 24. Body 22 is farther divided into a passenger compartment 26 and a trunk 28. The passenger compartment 26 and trunk 28 are separated by an exterior tulip panel 30 and an interior metallic seat back panel 32. Furthermore, a pair of rear wheel houses 34 protrude upwardly and inwardly within trunk 28 and passenger compartment 26. Also, a front header 36 extends transversely across the top of a windshield 38. A storage space 40 is located between a pair of front seats 42 and trunk 28 where rear seats (not shown) may be juxtapositioned. Referring to FIGS. 1, 2 and 10, retractable hard-top roof 24 is comprised of a front roof section 50, a rear roof section 52, a tonneau cover 54, an escutcheon 56, a balance link 58, a pair of retraction mechanisms 60 and a roof biasing device 62.

Front roof 50 is a rigid panel having an exterior surface 64 and an interior surface 66. Front roof 50 further has a latching and alignment mechanism (not shown) which is disengagably attachable with front header 36 when front and rear roofs 50 and 52, respectively, are in a fully extended position 70. Front roof 50 also includes any structural supports such as side rails or inner panels (not shown) attached thereto.

Figure 12:
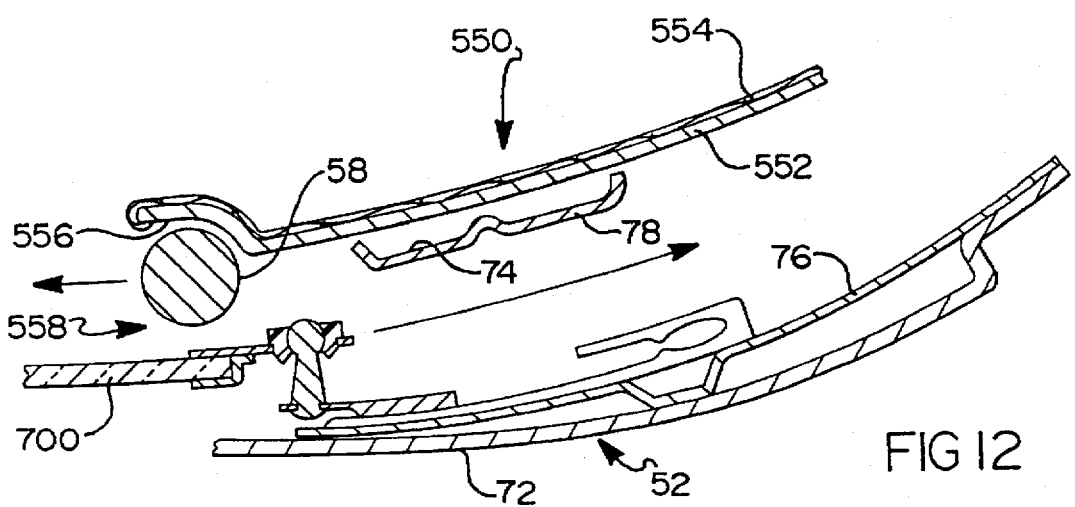
FIG. 12 is a cross sectional view, taken along line 12—12 of FIG. 11, showing the balance link and interior trim panel of the present invention.

As can best be observed in FIGS. 1, 10 and 12, rear roof 52 has an exterior surface 72 and an interior surface 74. Rear roof 52 further includes any structural supports such as side rails or inner panels 76 and 78 attached thereto. In its extended position 70, a lower portion 80 of rear roof 52 is adjacent with a theoretical surface defined by tulip panel 30 and the substantially horizontal portions of quarter panels 90. Front roof 50 and rear roof 52 are pivotably coupled to one another by a hinging device 94. Subsequently, when front and rear roofs 50 and 52, respectively, are in a fully retracted position 70', exterior surface 64 is in a horizontally stowed orientation between front seats 42 and trunk 28. Front roof 50 and rear roof 52 are preferably made from a lightweight but strong material such as sheet aluminum.

Figure 5:
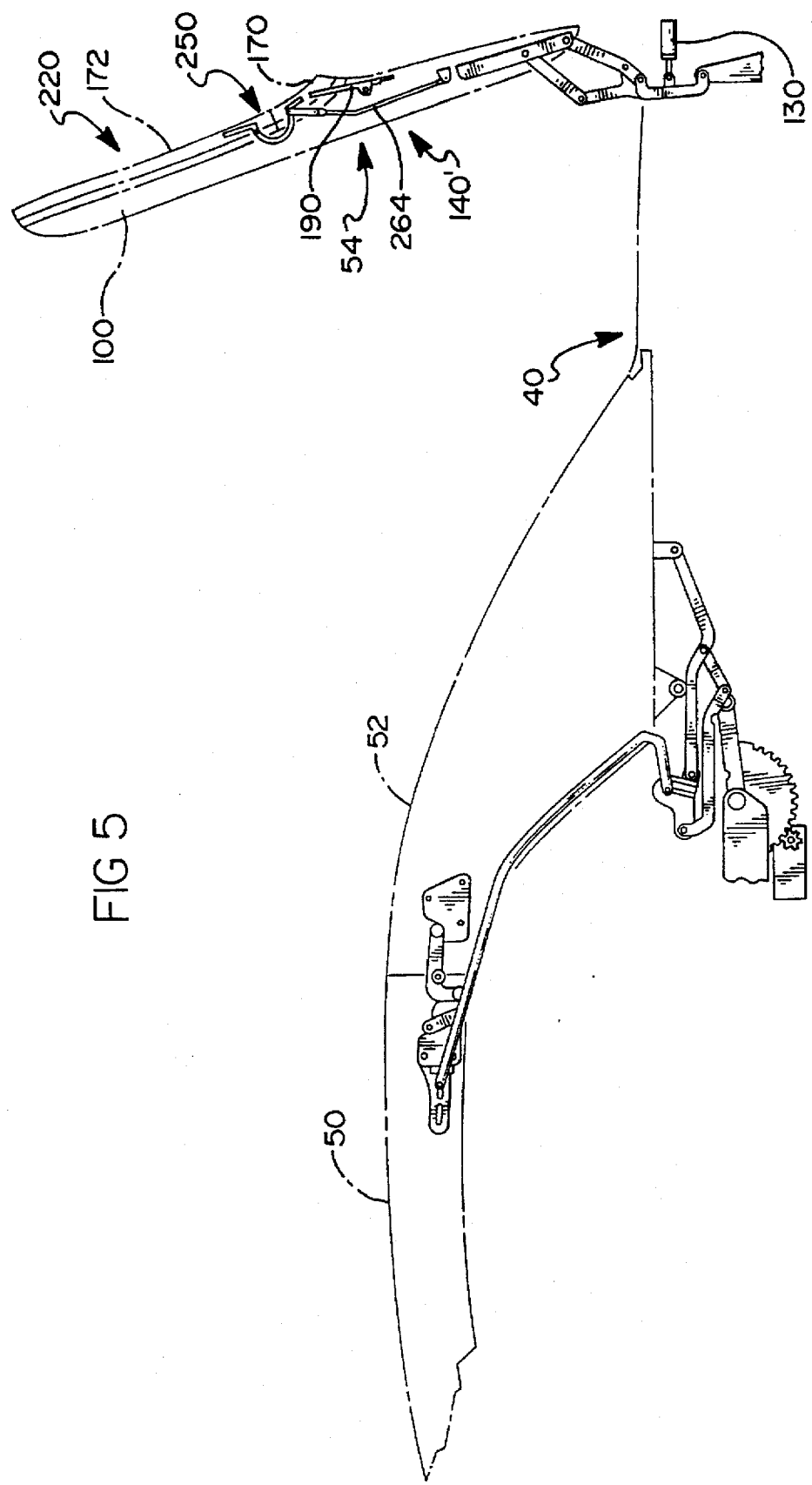
Figures 6, 7:
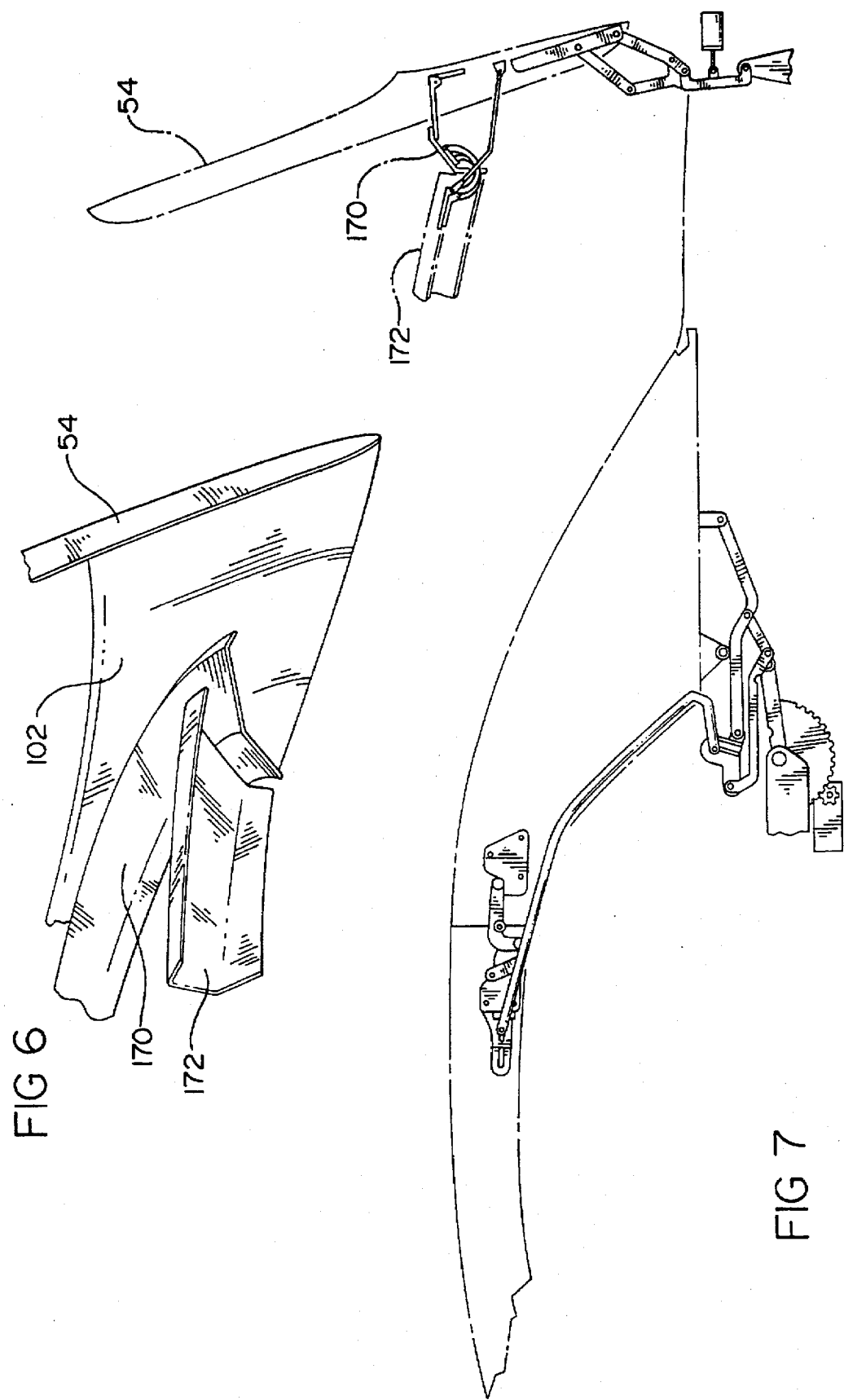

Referring to FIGS. 2, 3, 5 and 10, tonneau cover 54 is defined by an aesthetically pleasing external surface 100 and an internal surface 102, both of which are bordered by a forward facing edge 104, a rearward facing edge 106 and a pair of transversely disposed side edges 108 and 110. Forward facing edge 104 of tonneau cover 54 has a generally C-shaped plan view configuration. A pair of scissor arm linkage mechanisms 120 movably couple tonneau cover 54 to body 22 of automotive vehicle 20. Each scissor arm linkage mechanism 120 is comprised of a first set of linkage arms 122 which are pivotably coupled to body 22 at end 124. A second set of linkage arms 126 are pivotably coupled to first set of linkage arms 122 at pivot 128. Second set of linkage arms 126 are drivably connected to a fractional horse power direct current electric motor 130 at end 132. Ends 134 and 136 of first and second sets of linkage arms, respectively 122 and 126, are pivotably connected to a support 138. Support 138 is mounted, in turn, to internal surface 102 of tonneau cover 54. Thus, tonneau cover 54 is movable from a closed position 140 (FIG. 10) to an open position 140' (FIG. 5). Additionally, a pair of locator pins 142 project from internal surface 102 of tonneau cover 54 for positional alignment with a congruent receiving means within body 22 of automotive vehicle 20. Tonneau cover 54 is preferably made from aluminum. Furthermore, external surface 100 of tonneau cover 54 is painted to correspond with the adjacent body 26. Alternately, one skilled in the art would know that a pair of gooseneck-type arms can also be used to pivotably couple tonneau cover 54 to body 26 of automotive vehicle 20.

Escutcheon 56 is defined by a central member 170 having a substantially transverse orientation thereto and a pair of lateral members 172 extending in a substantially forward direction from curved ends of central member 170. Central and lateral members, respectively 170 and 172, further have an aesthetically pleasing appearance face 174 and a backside face 176. Escutcheon 56 is preferably formed from a resin impregnated sheet of fiberglass with appearance face 174 being defined by a vinyl covering. Central member 170 is coupled to tonneau cover 54 by a pair of steel hinges 190. Each hinge 190 has a hinge spring 192 coiled around a pivot pin so as to bias hinge 190 and central member 170 in a functional position 220 (FIG. 5). Hinges 190 are mounted to central member 170 and tonneau cover 54 through a plurality of screws. In cooperation therewith, a fractional horse power direct current electric motor or actuator 194 is centrally mounted upon tonneau cover 54. Actuator 194 operably drives a pair of force transmitting means such as a cable 196 which can be obtained from Combiner Incorporated or Hylex Incorporated. Cable 196 is positionally maintained at a distal end 198 thereof by a guide 200 having a pair of rollers rotatably journalled therein. Distal end 198 of cable is pivotably connected to a flange 202 projecting from a portion of bracket 190 coincidental with central member 170. Thus, actuator 194 pulls cable 196 thereby folding central member 170 to a hidden position 220', (FIG. 10) adjacent to internal surface 102 of tonneau cover 54.

Figure 15:
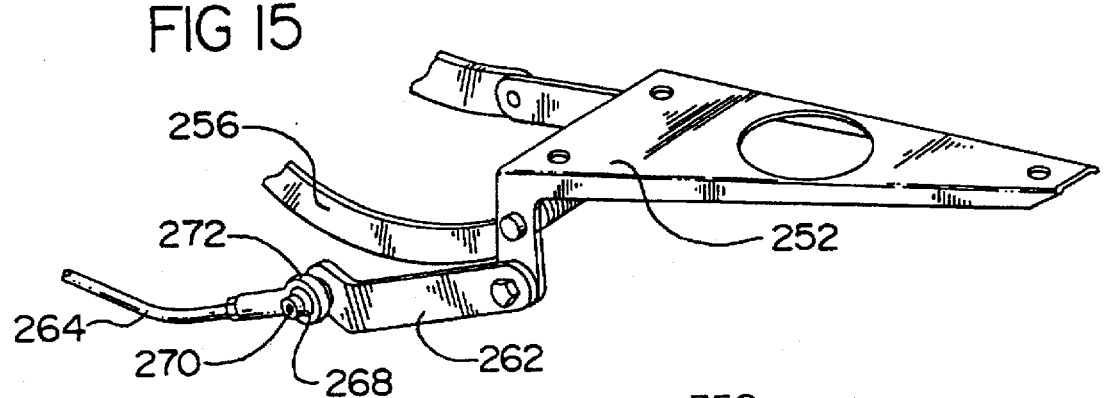
FIG. 15 is an enlarged fragmentary perspective view, taken within circle 15 of FIG. 3, of the apparatus of the present invention.

A folding mechanism 250 is constructed with a first plate 252, a second plate 254 and a plurality of linkages 256. First plate 252 is screwed to backside face 176 of each lateral member 172 and second plate 254 is screwed upon backside face 176 of central member 170. Three arcuately-shaped linkages 256 pivotably couple first plate 252 to second plate 254 for controlling three-dimensional folding movement therebetween. A folding mechanism spring 258 serves to bias folding mechanism 250 in functional position 220. First plate 252 further has a flange 260 protruding therefrom upon which a connecting arm 262 and a control link 264 are pivotably attached. Control link 264 is oppositely coupled with a tab 266 protruding from guide 200 thereby causing each lateral member 172 to foldably move in cooperation with the movement between central member 170 and the adjacent tonneau cover 54. A potentiometer or limit switch 280 is provided to determine the relative orientation between central member 170 and tonneau cover 54. When a predetermined position is reached, limit switch 280 will stop actuator 194. Limit switch 280 can be used in combination with the system disclosed in U.S. Pat. No. 5,225,747 entitled "Single-Button Actuated Self-Correcting Automatic Convertible Top" which issued to Helms et al. on Jul. 6, 1993 and which has a common assignee with the present invention; this patent is incorporated by reference herewithin. Of course, a limit switch can be employed between lateral members 172 and central member 170. As can best be observed in FIGS. 3 and 15, control link 264 has a ball socket 268 and screw 270 attachment which are partially trapped within a yoke 272 at each end thereof. Additionally, an elastomeric bumper 290 is mounted upon each lateral member 172 to prevent undesirable noise or sudden impact during folding.

Figure 16:
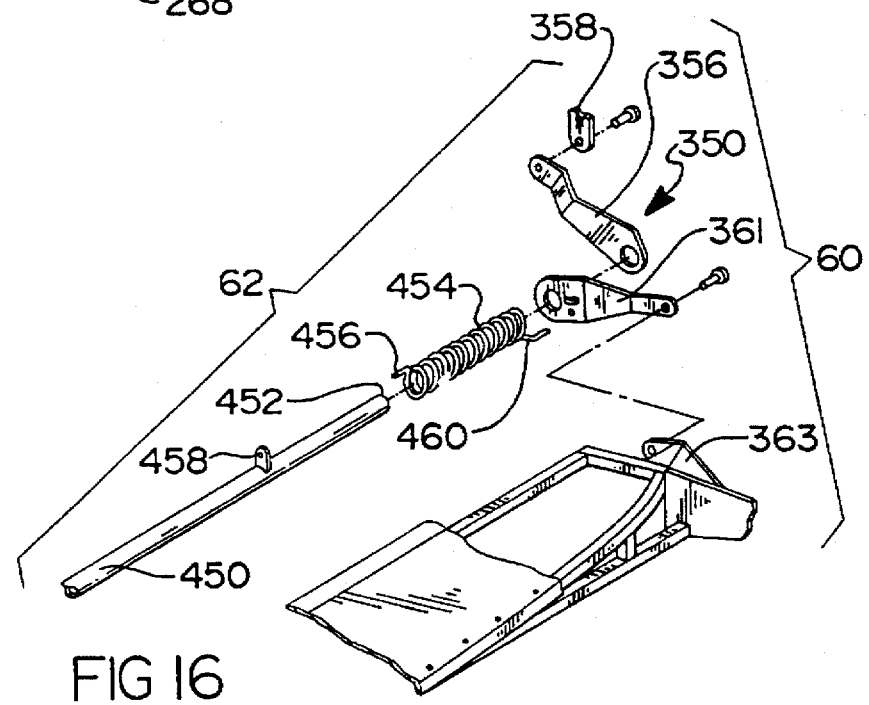
FIG. 16 is a fragmentary exploded perspective view of the preferred embodiment of a roof biasing device employed within the apparatus of the present invention of FIG. 1 as shown when a roof is in a fully extended position thereof.
Figure 17:
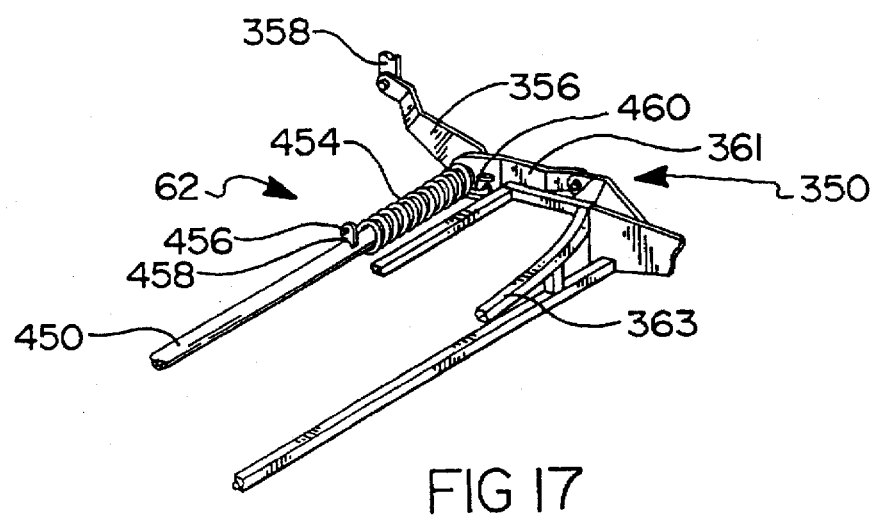
FIG. 17 is a fragmentary assembled perspective view of the roof biasing device employed within the apparatus of the present invention of FIG. 16.

Referring to FIGS. 10 and 16 through 17, each retraction mechanism 60 is comprised of a plurality of roof linkages 350, a cam 352 and a fractional horse power direct current electric motor 354. A first roof linkage 356 is pivotably coupled to a tab 358 extending from lower portion 80 of rear roof 52. A second roof linkage 360 is pivotably coupled to body 22 of automotive vehicle 20 (see FIG. 1). Acting in concert therewith, a third roof linkage 361 is pivotably coupled to first roof linkage 356 and a package shelf structure 363. Package shelf structure 363 is covered by a shelf trim panel 365 (see FIG. 11) containing a pair of raised holding formations. Moreover, rear roof 52 is pivotably coupled to body 22 at pivot 362. Cam 352 is defined by a sector gear 364 having a set of teeth peripherally located thereon and further having second roof linkage 360 extending therefrom. Motor 354 drivably rotates cam 352 which, in turn, actuates the plurality of roof linkages 350 during extension and retraction of front and rear roofs 50 and 52, respectively.

Roof biasing device 62 acts in concert with retraction mechanisms 60 so as to bias roof 24 toward extended position 70. This inhibits undesirable stress build-up and prevents uncontrollable movement of roof 24 during retraction due to the significant weight thereof. Roof biasing device 62 is comprised of a transversely oriented axle 450 which is mounted upon first roof linkage 356 adjacent to either end 452 of axle 450 for corresponding movement therewith. A pair of coiled torsion springs 454 are wrapped around portions of axle 450 proximate to each end 452. An inboard end 456 of each coiled spring 454 is affixed to a brace 458 projecting normal to a longitudinal axis of axle 450. An outboard end 460 of each coiled spring 454 is oppositely attached for rotational movement to third roof linkage 361 which is journalled about axle 450. Coiled spring 454 is caused to be further wound due to the rotational movement of outboard end 460 of coiled spring 454 in relation to inboard end 456 thereof during retraction of the plurality of roof linkage 350. Alternately, axle 450 is firmly mounted to body 26 (see FIG. 1) and outboard end 460 of each coiled spring 454 is fit within a keyhole slot located in a movable roof linkage or hinge.

Figure 11:
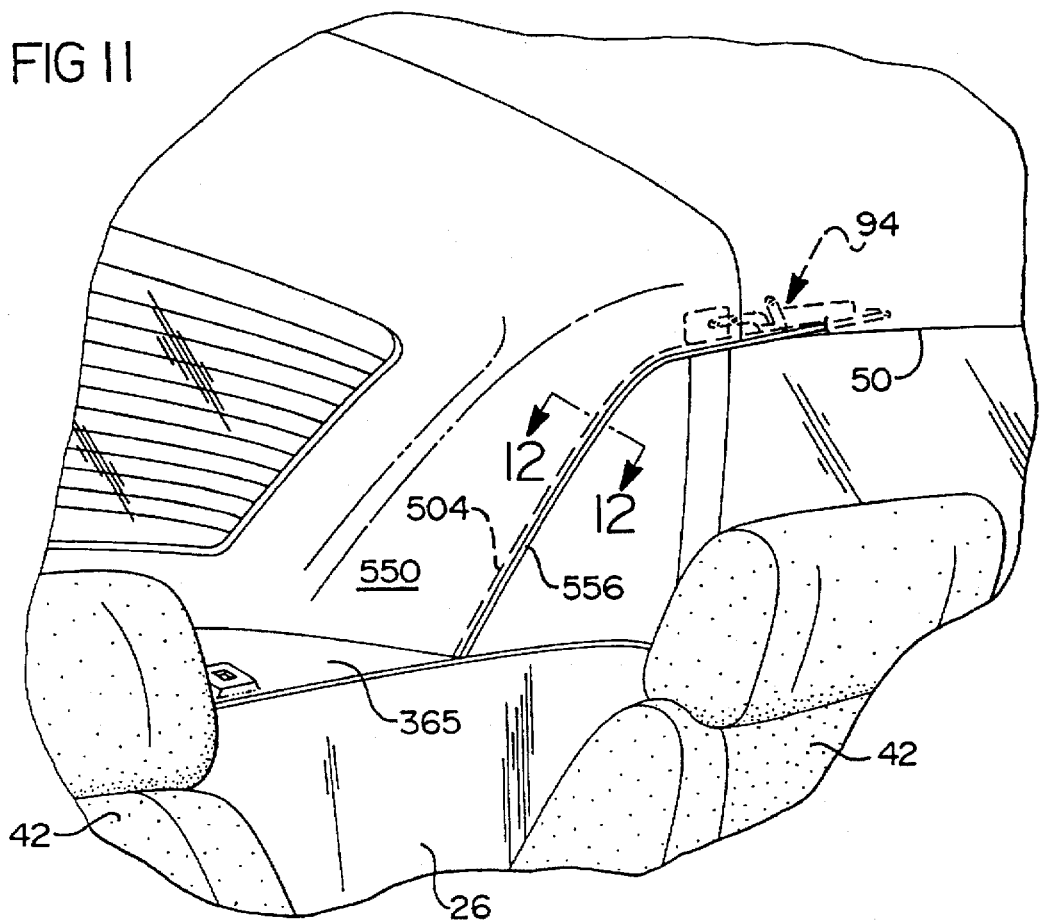
FIG. 11 is a fragmentary perspective view showing the preferred embodiment of a balance link and an interior trim panel employed within the apparatus of the present invention of FIG. 1.

Balance link 58 is defined by a proximal end 500, a distal end 502 and an intermediate portion 504 therebetween. This is best illustrated in FIGS. 10 through 12. Balance link 58 is preferably a solid steel member but may alternatively be hollow. Distal end 502 is pivotably coupled to the plurality of roof linkages 350 and distal end 502 of balance link 58 is directly coupled to a side rail of front roof 50 or to hinge 94 which foldably connects front roof 50 to rear roof 52.

An interior trim panel 550 is affixed to rear roof 52 adjacent to interior surface 74 thereof. Interior trim panel 550 is comprised of a substantially resin impregnated compression molded fiberglass substrate 552 upon which a cloth or vinyl covering material 554 is adhered. Interior trim panel 550 further has a somewhat vertically elongated pocket 556 formed therein with an elongated forward facing open portion 558 being in registry with pocket 556. Open portion 558 allows access of intermediate portion 504 of balance link 58 therein when front roof 50 and, in turn, balance link 58 are located in extended position 70. Accordingly, pocket 556 acts to somewhat hide intermediate portion 504 of balance link 58 when viewed from within passenger compartment 26 of automotive vehicle 20 (see FIG. 1).

Figure 13:
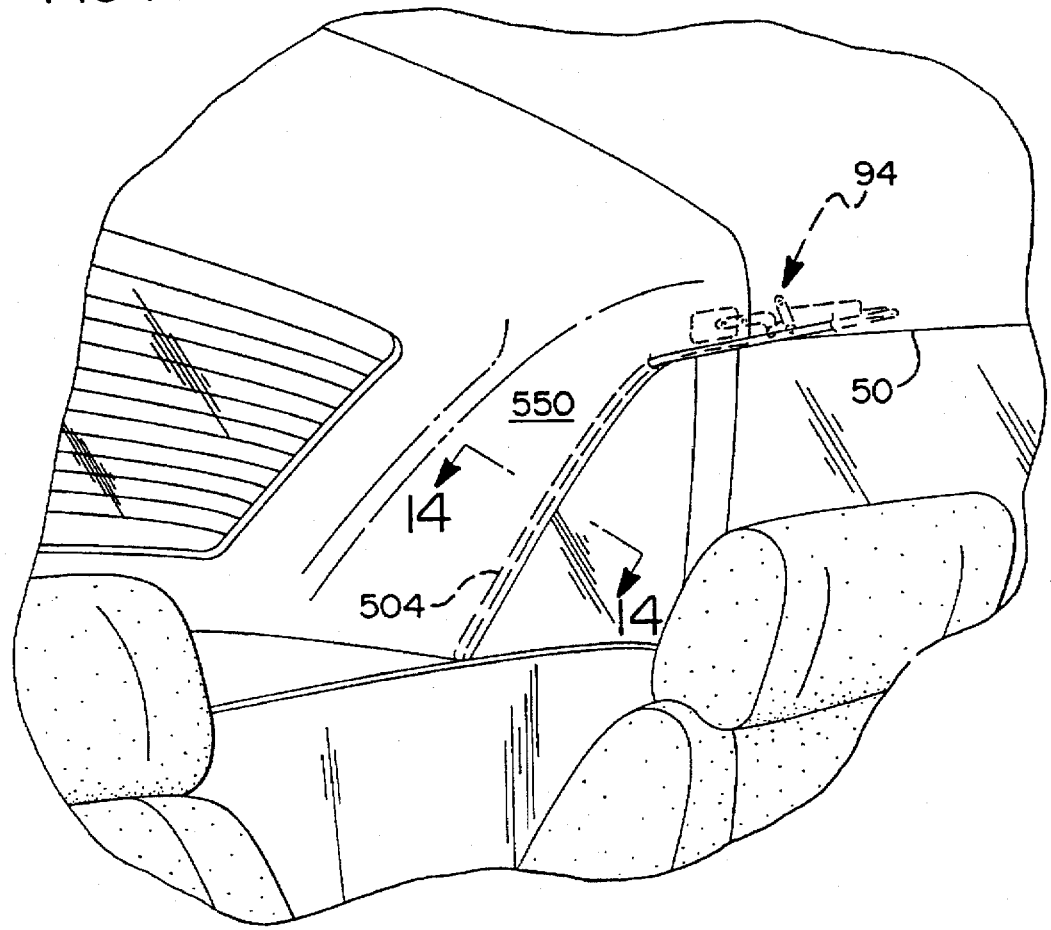
FIG. 13 is a fragmentary perspective view of an alternate embodiment of a balance link and interior trim panel employed within the apparatus of the present invention of FIG. 1.
Figure 14:
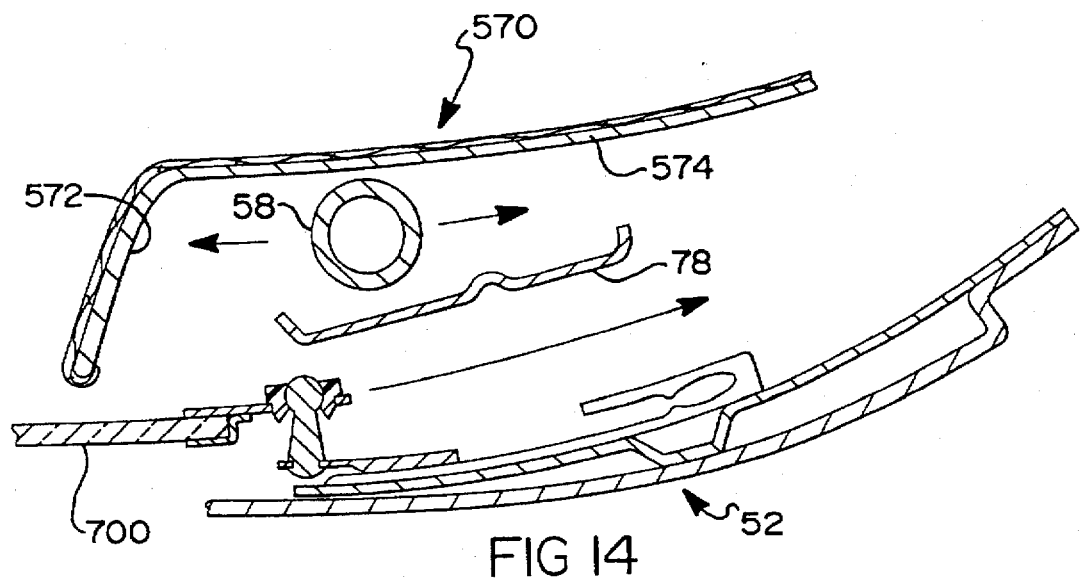
FIG. 14 is a cross sectional view, taken along line 14—14 of FIG. 13, showing the alternate embodiment of the balance link and interior trim panel apparatus of the present invention.

An alternative embodiment of an interior trim panel 570 is shown in FIGS. 13 and 14. In this embodiment, interior trim panel 570 has a forward facing lip 572 and a transversely facing body 574 which fully hides intermediate portion of balance link 58 therein. Nevertheless, intermediate portion 504 of balance link 58 is allowed to translate in a fore and aft direction between transversely facing body 574 and inner panel 78 of rear roof 52.

Figure 4:
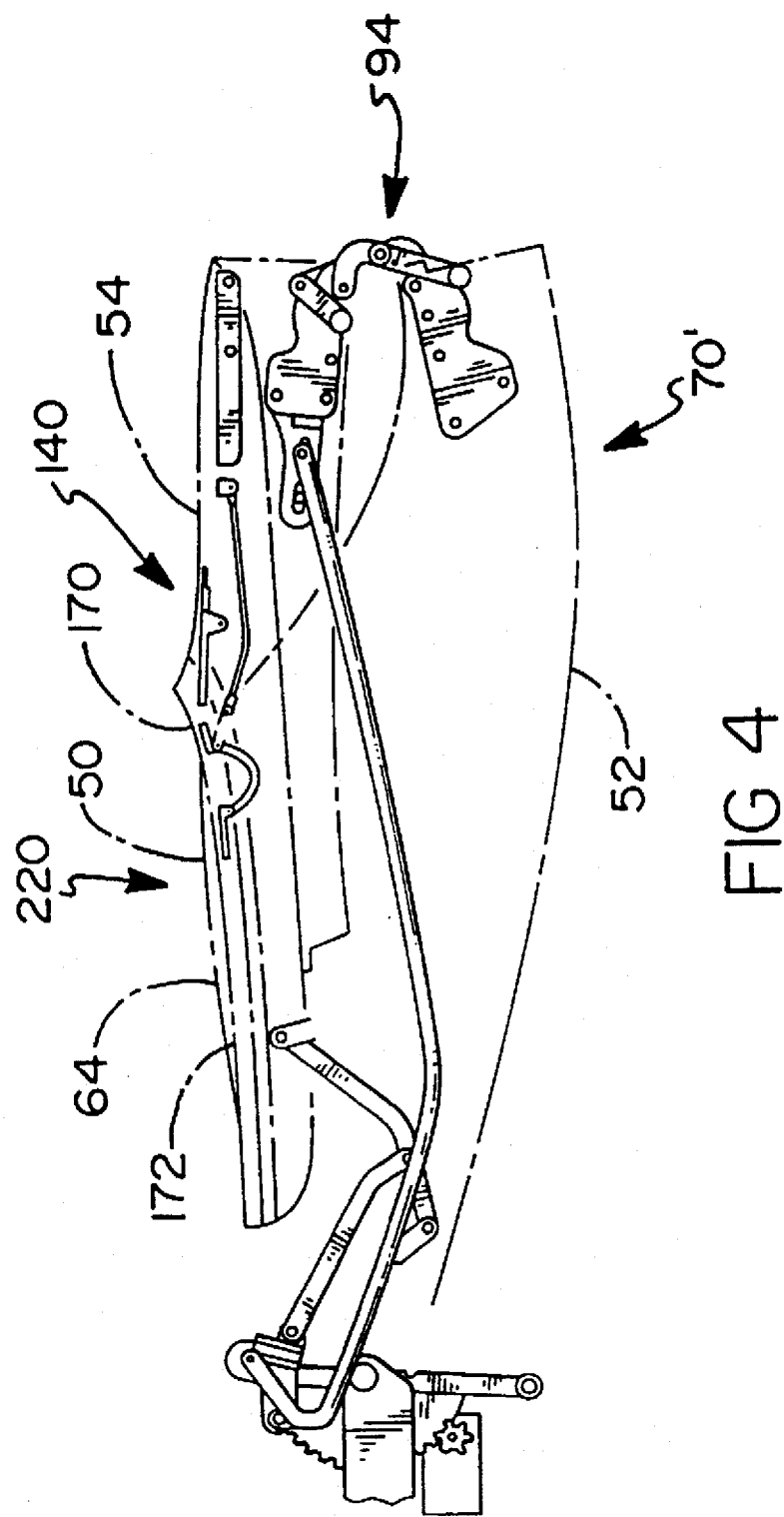

The series of sequential extending positions of front roof 50, rear roof 52, escutcheon 56, tonneau cover 54 and retraction mechanism 60 are shown in FIGS. 4 through 10. In FIG. 4, front roof 50 and rear roof 52 are shown in retracted position 70'. Accordingly, interior surface 66 (see FIG. 10) of front roof 50 is folded in a clam-shelled manner against interior surface 74 (see FIG. 12) of rear roof 52. Disposed adjacent thereto, tonneau cover 54 is located in closed position 140 while central member 170 and both lateral members 172 are extended in their functional positions 220 so as to rest upon exterior surface 64 of front roof 50. Thus, central and lateral members, respectively 170 and 172, serve to aesthetically cover any gaps between front roof 50 and the adjacent tonneau cover 54.

Referring to FIG. 5, tonneau cover 54 is pivotably raised to open position 140'. This allows front and rear roofs 50 and 52, respectively, to be extended from storage space 40. As can be observed in FIGS. 6 and 7, lateral members 172 are then folded inward upon central member 170. Subsequently, FIGS. 8 and 9 then show lateral member 172 fully folded against central member 170 and central member 170 fully folded against internal surface 102 of tonneau cover 54. Therefore, escutcheon 56 is shown located in its hidden position 220'.

Referring to FIG. 10, tonneau cover 54 is subsequently lowered to its closed position 140 adjacent to lower portion 80 of rear roof 52. In this position, escutcheon 56 is fully hidden from view external to automotive vehicle 20 (see FIG. 1). Additionally, as can be observed in FIG. 12, a quarter window assembly 700 is provided which can be extended or retracted from within rear roof 52. Returning to FIG. 10, the present invention provides a close-out apparatus having differing front edge configurations when roof 24 is in its extended position 70 and in its retracted position 70' (see FIG. 4).

While various embodiments of the apparatus of the present invention have been disclosed, it will be appreciated that many modifications may be made without departing from the present invention. For example, a soft-top roof or a combination of hard-top and soft-top sections within a roof may be employed in combination with the disclosed apparatus. Also, the escutcheon of the present invention may be used without a tonneau cover. Furthermore, the escutcheon may have alternate shapes and folding or sliding segments thereto. The hinging, folding and scissor arm mechanisms may all be substituted by gear, gooseneck, ball and socket, pneumatic, hydraulic or other pivoting devices. Moreover, the actuator may comprise a manually operated crank. Force transmitting device can alternately employ a rod to move the escutcheon in relation to the tonneau cover. While various materials have been disclosed in an exemplary fashion, it would be obvious to one skilled in the art to provide alternate materials. It is intended by the following claims to cover these and any other departures from the disclosed embodiments which fall within the true spirit of this invention.

The invention claimed is:

1. An apparatus for use in an automotive vehicle having a convertible roof system, said automotive vehicle further having a body with a passenger compartment, said apparatus comprising:

a roof movable from a retracted position to an extended position disposed above said passenger compartment;

an escutcheon disposed proximate with said roof and having a substantially transversely oriented segment, said escutcheon further being movable between a functional position and a hidden position, said functional position allowing said escutcheon to be substantially visible external to said automotive vehicle and said hidden position allowing said escutcheon to be substantially hidden from view external to said automotive vehicle, said escutcheon being located in said functional position when said roof is in said retracted position and said escutcheon being located in said hidden position when said roof is in said extended position, said escutcheon having a substantially C-shape when disposed in said functional position and observed in a top view; and a tonneau cover movably coupled to said body of said automotive vehicle and disposed against a portion of an exterior surface of said roof when said roof is disposed in said extended position;

said escutcheon being coupled to said tonneau cover and being located against said roof when said roof is disposed in said retracted position below said escutcheon.

2. The apparatus of claim 1 wherein:

said escutcheon is defined by an aesthetically pleasing appearance face and a backside face;

said tonneau cover has an aesthetically pleasing external surface and an internal surface; and said escutcheon is coupled to said tonneau cover, at least a predefined segment of said backside face of said escutcheon is folded to substantially oppose said internal surface of said tonneau cover when said escutcheon is in said hidden position.

3. The apparatus of claim 3 wherein said escutcheon includes:

a central member having a substantially transverse orientation; and a pair of lateral members movably coupled to and extending in a substantially forward direction from predetermined segments of said central member.

4. The apparatus of claim 3 wherein said pair of lateral members are collapsible substantially against said central member during movement of said escutcheon to said hidden position.

5. The apparatus of claim 4 further comprising a folding mechanism coupling each of said pair of lateral members to said central member, each of said lateral members coupled to said central member.

6. The apparatus of claim 5 wherein said folding mechanism includes:

a first plate affixed to said backside face of each of said pair of lateral members;

a second plate affixed to said backside face of said central member; and a plurality of linkages connecting and controlling folding movement of said first plate and said second plate.

7. The apparatus of claim 3 further comprising a control link coupling each of said pair of lateral members to said central member.

8. The apparatus of claim 7 further comprising a limit switch positioned between said central and lateral members for determining the relative orientation between said members.

9. The apparatus of claim 2 further comprising:

an actuator; and means for transmitting force drivably coupled to said actuator and also being operably coupled to said escutcheon whereby said force transmitting means can move said escutcheon from said functional position to said hidden position.

10. The apparatus of claim 9 wherein said force transmitting means is a cable.

11. The apparatus of claim 9 wherein said actuator is a fractional horsepower electric motor.

12. The apparatus of claim 9 wherein said actuator is mounted upon said internal surface of said tonneau cover.

13. The apparatus of claim 2 further comprising a hinge operably coupling said backside face of said escutcheon to said internal surface of said tonneau cover.

14. The apparatus of claim 13 further comprising a spring attached to said hinge for biasing said escutcheon to said functional position.

15. The apparatus of claim 1 further comprising:

means for movably coupling said internal surface of said tonneau cover to said body of said automotive vehicle;

said tonneau cover being movable from a closed position to an open position, said tonneau cover being disposed in said closed position when said roof is fully in said extended and retracted positions.

16. The apparatus of claim 15 wherein said coupling means includes a scissor-arm linkage mechanism defined by a first set of linkage arms pivotably coupled to said body of said automotive vehicle and a second set of linkage arms drivably coupled to a fractional horsepower electric motor.

17. The apparatus of claim 1 wherein said escutcheon has a substantially curved C-shaped plan view configuration when disposed in said functional position and has a substantially inverted U-shaped cross section.

18. The apparatus of claim 1 wherein said roof includes:

a front roof section being substantially rigid; and a rear roof section disposed substantially behind said front roof section when said roof is in said extended position;

said front roof section being collapsible against said rear roof section during retraction.

19. The apparatus of claim 18 wherein an exterior surface of said front roof section is at least partially visible external to said automotive vehicle when said roof is in said retracted position.

20. The apparatus of claim 18 wherein said from roof section is disposed in a substantially horizontal orientation behind a pair of front seats and within said passenger compartment when in said retracted position.

21. The apparatus of claim 18 wherein said front roof section folds against said rear roof section in a clam-shelling manner during retraction.

22. The apparatus of claim 1 further comprising:
a retraction mechanism movably coupling said roof to said body of said automotive vehicle; and
a balance link pivotably coupled to a predetermined portion of said roof at a distal end of said balance link and being pivotably coupled to said retraction mechanism at a proximal end of said balance link, said balance link further having an intermediate portion longitudinally provided between said distal and proximal ends.

23. The apparatus of claim 18 wherein said front roof section is disposed in a substantially horizontal orientation behind a pair of front seats and within said passenger compartment when in said retracted position.

24. The apparatus of claim 23 further comprising an elongated pocket of said interior trim panel having an elongated open portion for allowing access of said intermediate portion of said balance link whereby said intermediate portion is received therein when said roof is in said extended position, said pocket acting to substantially hide said intermediate portion of said balance link as viewed from within said passenger compartment of said automotive vehicle.

25. The apparatus of claim 1 further comprising:
an axle transversely oriented in said body of said automotive vehicle; and
a coiled spring wrapped around said axle with a first end of said coiled spring rotatably affixed to said axle and a second end of said coiled spring rotatably coupled to an adjacent of said pair of retraction mechanisms, whereby said coiled spring can be further wound.

26. The apparatus of claim 25 wherein said coiled spring serves to bias said roof toward said extended position.

27. The apparatus of claim 25 wherein said axle moves in cooperation with another adjacent linkage of a retraction mechanism during retraction and extension of said roof.

28. The apparatus of claim 27 wherein each of said pair of retraction mechanisms includes:
at least one of a plurality of roof linkages pivotably coupled with a lower portion of said roof and at least a second of said plurality of roof linkages pivotably coupled to said body of said automotive vehicle; and
means for driving said plurality of linkages.

29. The apparatus of claim 28 wherein said driving means includes:
a sector gear having a set of peripheral teeth, said second of said plurality of roof linkages extending from said sector gear; and
a fractional horsepower electric motor being in enmeshed engagement with said sector gear.

30. The apparatus of claim 25 wherein said axle moves in cooperation with another adjacent linkage of said retraction mechanisms during retraction and extension of said roof.

31. An apparatus for use in an automotive vehicle having a convertible roof system, said automotive vehicle further having a body with a passenger compartment, said apparatus comprising:
a roof movable from a retracted position to an extended position disposed above said passenger compartment, said roof including a front roof section being substantially rigid and a rear roof section being disposed substantially behind said front roof section when said roof is in said extended position, said front roof section being collapsible against said rear roof section during retraction, said front roof section folding against said rear roof section in a clam-shelling manner during retraction;
a tonneau cover movably coupled to said body of said automotive vehicle, said tonneau cover being disposed in registry with a portion of an exterior surface of said roof when said roof is disposed in said extended position, said tonneau cover having an aesthetically pleasing external surface and an internal surface, said tonneau cover being movable from a closed position to an open position, said tonneau cover being disposed in said closed position when said roof is fully in said extended and retracted positions;
an escutcheon disposed proximate with said roof and having a substantially transversely oriented segment, said escutcheon further being movable between a functional position and a hidden position, said functional position allowing said escutcheon to be substantially visible external to said automotive vehicle and said hidden position allowing said escutcheon to be substantially hidden from view external to said automotive vehicle, said escutcheon being located in said functional position when said roof is in said retracted position and said escutcheon located in said hidden position when said roof is in said extended position, said escutcheon being coupled to said tonneau cover for cooperative movement therewith and being located in registry against said roof when said roof is disposed in said retracted position, said escutcheon being defined by an aesthetically pleasing appearance face and a backside face, said escutcheon being coupled to said tonneau cover whereby at least a predefined segment of said backside face of said escutcheon is folded to substantially oppose said internal surface of said tonneau cover when said escutcheon is in said hidden position, said escutcheon having a substantially C-shaped plan view configuration when disposed in said functional position, said escutcheon including a central member having a substantially transverse orientation and a pair of lateral members movably coupled to and extending in a substantially forward direction from predetermined segments of said central member, said pair of lateral members being collapsible substantially against said central member during movement of said escutcheon to said hidden position; [thereof,]i
a folding mechanism coupling each of said pair of lateral members to said central member;
an actuator; and
means for transmitting force drivably coupled to said actuator and also operably coupled to said escutcheon whereby said force transmitting means can move said escutcheon from said functional position to said hidden position.

32. An apparatus for use in an automotive vehicle having a convertible roof, said automotive vehicle further having a body with a passenger compartment, said apparatus comprising:
a substantially rigid interior trim panel attached to said roof; and
a balance link having a distal end pivotably coupled to said roof, said balance link also having an intermediate portion;
said intermediate portion of said balance link being at least substantially hidden behind a portion of said interior trim panel as viewed from within said passenger compartment of said automotive vehicle when said roof is in a substantially extended position.

33. The apparatus of claim 32 further comprising an elongated pocket of said interior trim panel having an open portion for allowing access of said intermediate portion of said balance link whereby said intermediate portion is received therein when said roof is in said extended position, said pocket acting to a substantially hide said intermediate portion of said balance link as viewed from within said passenger compartment of said automotive vehicle.

34. The apparatus of claim 32 wherein said intermediate portion of said balance link is aesthetically displaced between said interior trim panel and said interior surface of said roof.

35. The apparatus of claim 32 wherein said interior trim panel includes:

a substantially rigid substrate fastened to said roof; and an aesthetically pleasing covering material mounted upon said substrate.

36. The apparatus of claim 32 wherein at least an outer portion of said roof is substantially rigid.

37. The apparatus of claim 32 wherein said roof includes:

a substantially rigid front roof section; and a rear roof section disposed substantially behind said front roof section when said roof is in said extended position;

said front roof section being collapsible against said rear roof section during retraction.

38. The apparatus of claim 37 wherein an exterior surface of said front roof section is at least partially visible external to said automotive vehicle when said roof is in said retracted position.

39. The apparatus of claim 37 wherein said from roof section is disposed in a substantially horizontal orientation behind a pair of front seats and within said passenger compartment when in said retracted position.

40. The apparatus of claim 32 wherein said front roof section folds against said rear roof section in a clam-shelling manner during retraction.

41. An apparatus for use in an automotive vehicle having a convertible roof movable between an extended position and a retracted position, said automotive vehicle further having a body with a passenger compartment and a pair of front seats, said apparatus comprising:

a substantially rigid front roof section, a rear roof section disposed substantially behind said front roof section when said roof is in said extended position, said front roof section being collapsible against said rear roof section during movement to said retracted position, said front roof section being disposed in a substantially horizontal orientation behind a pair of front seats and within said passenger compartment when in said retracted position, said front roof section folding against said rear roof section in a clam-shelling manner during retraction, an exterior surface of said front roof section being at least partially visible external to said automotive vehicle when said roof is in said retracted position;

a balance link having a distal end pivotably coupled to said roof, said balance link also having an intermediate portion; and a substantially rigid interior trim panel attached to said roof and having an elongated pocket with an open portion for allowing access of said intermediate portion of said balance link whereby said intermediate portion is received therein when said roof is in said extended position, said pocket acting to substantially hide said intermediate portion of said balance link as viewed from within said passenger compartment of said automotive vehicle, said interior trim panel including a substantially rigid substrate fastened to said roof.

42. An apparatus for use in an automotive vehicle, said apparatus comprising:

a convertible roof movable from an extended position to a retracted position;

a pivoting member disposed adjacent to said roof when said roof is pivoted to a substantially horizontal orientation; and a pair of lateral members being coupled to outboard segments of said pivoting member, said pair of lateral members being movable from a first position when said roof is located in said extended position to a second and different position when said roof is located in said retracted position.

43. The apparatus of claim 42 further comprising:

an actuator; and means for transmitting force drivably coupled to said actuator and also operably coupled to said pair of lateral members whereby said force transmitting means can move said pair of lateral members from said first position to said second position.

44. The apparatus of claim 43 wherein said force transmitting means is a cable.

45. The apparatus of claim 43 wherein said actuator is a fractional horsepower electric motor.

46. The apparatus of claim 43 wherein said actuator is mounted upon said internal surface of said pivoting member.

47. The apparatus of claim 43 further comprising a spring biasing said pair of lateral members to said first position.

48. The apparatus of claim 42 wherein:

said pivoting member is a rigid tonneau cover movably coupled to a body of said automotive vehicle, said tonneau cover is disposed in registry with a portion of an exterior surface of said roof when said roof is disposed in said extended position; and said pair of lateral members are coupled to said tonneau cover for cooperative movement therewith and are located in registry against lateral segments of said roof when said roof is disposed in said extended position.

49. The apparatus of claim 48 further comprising:

means for movably coupling an internal surface of said tonneau cover to said body of said automotive vehicle; and said tonneau cover being movable from a closed position to an open position, said tonneau cover being disposed in said closed position when said roof is fully in said extended and retracted positions.

50. The apparatus of claim 49 wherein said coupling means includes a scissor-arm linkage mechanism defined by a first set of linkage arms pivotably coupled to said body of said automotive vehicle and a second set of linkage arms drivably coupled to a fractional horsepower electric motor.

51. The apparatus of claim 42 wherein said roof includes:

a substantially rigid front roof section; and a rear roof section disposed substantially behind said front roof section when said roof is in said extended position;

wherein said front roof section is collapsible against said rear roof section during retraction.

52. The apparatus of claim 51 wherein said rear roof section is substantially rigid.

53. The apparatus of claim 52 wherein said front roof section folds inwardly against said rear roof section in a clam-shelling manner during retraction.

54. The apparatus of claim 51 further comprising a rigid and movable tonneau cover covering at least a portion of said roof when said roof is disposed in said retracted position, said front roof section being stowed in a substantially horizontal manner.

55. The apparatus of claim 42 further comprising folding means for coupling said pair of lateral members to said pivoting member.

56. The apparatus of claim 42 further comprising a limit switch actuable between said pivoting member and at least one of said pair of lateral members for determining the relative orientation between said members.

57. An apparatus for use in an automotive vehicle having a body, said apparatus comprising:

a convertible roof movable from an extended position to a retracted position;

a pivoting member being movably coupled to said body of said automotive vehicle, said pivoting member registering with a portion of an exterior surface of said roof when said roof is disposed in said extended position, said pivoting member having an aesthetically pleasing external surface and an internal surface, said pivoting member being movable from a closed position to an open position;

an escutcheon being disposed proximate with said roof when in said retracted position and having a substantially transversely oriented segment, said escutcheon further being movable between a first position and a second position, said escutcheon being located in said first position when said roof is in said retracted position and said escutcheon being located in said second position when said roof is in said extended position, said escutcheon being coupled to said pivoting member, a lateral member movably coupled to said escutcheon substantially forward of said transversely oriented segment;

at least one actuator; and means for transmitting force being drivably coupled to said at least one actuator and also operably coupled to said escutcheon whereby said force transmitting means can move said escutcheon from said first position to said second position.

58. The apparatus of claim 57 wherein said roof includes rigid front and rear hard top sections, said front roof section folds against said rear roof section in a clam-shelling manner during retraction.

59. The apparatus of claim 57 wherein said pivoting member is a rigid tonneau cover, said tonneau cover and said escutcheon serve to cover at least a portion of said roof when said roof is disposed in said retracted position.

60. An apparatus for use in an automotive vehicle having a body, said apparatus comprising:

a convertible roof movable from an extended position to a retracted position, said roof including a substantially rigid front roof section and a substantially rigid rear roof section disposed substantially behind said front roof section when said roof is in said extended position, said front roof section inwardly folding against said rear roof section in a clam-shelling manner during retraction;

a pivoting member pivotal in relation to said body of said automotive vehicle, said pivoting member registering with a portion of an exterior surface of said roof when said roof is disposed in said extended position, said pivoting member having an aesthetically pleasing external surface, said pivoting member being pivotable about a rear pivot axis from a closed position to an open position; and a pair of lateral members coupled to said automotive vehicle, each of said lateral members being movable between a substantially horizontal position and a second position, said horizontal positions allowing said lateral members to be substantially visible external to said automotive vehicle and said second positions allowing said lateral members to be substantially hidden from view external to said automotive vehicle, said lateral members being located in said horizontal positions when said roof is in said retracted position and said lateral members being located in said second positions when said roof is in said extended position.

61. The apparatus of claim 60 further comprising a pair of folding mechanisms coupling said pair of said lateral members to said pivoting member.

62. The apparatus of claim 61 further comprising:

an actuator; and means for transmitting force drivably coupled to said actuator and also operably coupled to said pair of lateral members whereby said force transmitting means can move said pair of lateral members from said first position to said second position.

* * * * *

UNITED STATES PATENT AND TRADEMARK OFFICE
CERTIFICATE OF CORRECTION

PATENT NO. : 5,743,587
DATED : April 28, 1998
INVENTOR(S) : Michael P. Alexander et al It is certified that error appears in the above-indentified patent and that said Letters Patent is hereby corrected as shown below:

On the Title Page, under Foreign Patent Documents, insert -- 2174759 United Kingdom --
-- 493260 Belgium --.

Column 3, line 29, "farther" should be -- further --.

Column 7, line 40, after "and" insert -- being --.

Column 7, line 57, "3" should be -- 2 --.

Column 8, line 3, after "members" insert -- being --.

Column 10, line 47, delete "[thereof,]i".

Column 11, line 9, delete "a".

Column 11, line 34, "from" should be -- front --.

Column 11, line 38, "32" should be -- 37 --.

Column 11, line 52, "a" should be -- said --.

Column 12, line 13, delete "being".

Column 12, line 47, delete "and".

Column 13, line 17, delete "being".

UNITED STATES PATENT AND TRADEMARK OFFICE
CERTIFICATE OF CORRECTION

PATENT NO. : 5,743,587
DATED : April 28, 1998
INVENTOR(S) : Michael P. Alexander et al It is certified that error appears in the above-indentified patent and that said Letters Patent is hereby corrected as shown below:

Column 13, line 26, delete "being".

Column 13, line 39, delete "being".

Column 14, line 12, "inwardly folding" should be -- folding inwardly --.

Signed and Sealed this

First Day of December, 1998

*Attest:*

*Attesting Officer*

BRUCE LEHMAN

*Commissioner of Patents and Trademarks*